US009431800B2

(12) United States Patent
Yoshida et al.

(10) Patent No.: US 9,431,800 B2
(45) Date of Patent: Aug. 30, 2016

(54) GAS-INSULATED ELECTRIC DEVICE

(75) Inventors: Tadahiro Yoshida, Tokyo (JP); Kazuki Takahashi, Tokyo (JP); Katsushi Nakada, Tokyo (JP); Masahiro Arioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 278 days.

(21) Appl. No.: 13/806,202

(22) PCT Filed: Sep. 13, 2010

(86) PCT No.: PCT/JP2010/065722
§ 371 (c)(1),
(2), (4) Date: Dec. 21, 2012

(87) PCT Pub. No.: WO2012/035596
PCT Pub. Date: Mar. 22, 2012

(65) Prior Publication Data
US 2013/0100587 A1    Apr. 25, 2013

(51) Int. Cl.
*H02B 13/045*    (2006.01)
*H02B 13/035*    (2006.01)
*H02B 1/56*    (2006.01)

(52) U.S. Cl.
CPC ........ *H02B 13/045* (2013.01); *H02B 13/0358* (2013.01); *H02B 1/56* (2013.01)

(58) Field of Classification Search
CPC ... H02B 13/0358; H02B 13/045; H02B 1/56
USPC ....................................................... 174/26 G
See application file for complete search history.

(56) References Cited

U.S. PATENT DOCUMENTS 3,715,532 A * 2/1973 Morva .................. H02G 5/068
                                                174/28
5,045,652 A * 9/1991 Yanabu .................. H01H 33/24
                                                218/116
2010/0072175 A1* 3/2010 Stenzel ................ H01H 31/003
                                                218/89

FOREIGN PATENT DOCUMENTS

DE         27 08 359 A1      8/1978
DE          3248212 A1  *  7/1984   ......... H02B 13/0358
(Continued)

OTHER PUBLICATIONS

International Search Report Issued Oct. 12, 2010 in PCT/JP10/065722 Filed Sep. 13, 2010.
(Continued)

*Primary Examiner* — Timothy Thompson
*Assistant Examiner* — Paul McGee, III
(74) *Attorney, Agent, or Firm* — Oblon, McClelland, Maier & Neustadt, L.L.P (57) ABSTRACT

A gas-insulated electric device, by which a cross-sectional area of a central conductor can be reduced. The gas-insulated electric device includes an insulation tube that ranges to portions facing to ground potential portions for a central conductor and to upper-lower portions along the grounding potential portions, and is coaxially arranged along the central conductor in a state where a gap intervenes between the central conductor and the insulation tube; a conductive layer that is formed on an inner surface of an insulation tube and is electrically connected to the central conductor; and a ground layer that is formed on an inner surface or an outer surface of the insulation tube and is grounded; in which heat generated from the central conductor is radiated by convecting the insulation gas through the gap between the central conductor and insulation tube.

19 Claims, 6 Drawing Sheets

(56) References Cited

FOREIGN PATENT DOCUMENTS

| | | | |
|---|---|---|---|
| DE | 100 37 432 A1 | | 2/2002 |
| JP | 55 112332 | | 8/1980 |
| JP | 2001 266681 | | 9/2001 |
| JP | 2001266681 A | * | 9/2001 |
| JP | 2003 319515 | | 11/2003 |
| JP | 2004 56845 | | 2/2004 |
| JP | 2004056845 A | * | 2/2004 |

OTHER PUBLICATIONS

German Office Action issued in Application No. 11 2010 005 871.7 on Jul. 13, 2015 (w/ English translation).

* cited by examiner

GAS-INSULATED ELECTRIC DEVICE

TECHNICAL FIELD

The present invention relates to a gas-insulated electric device used for an electric power transmission-distribution facility, an electric power reception-distribution facility and the like, and particularly relates to a device by which a heatproof temperature of an insulator is lowered, and a cross-sectional area of a conductor is reduced.

BACKGROUND ART

In a conventional gas-insulated switchgear, in order to electrically insulate between a pressure tank for encapsulating insulation gas, such as dry air, and a conductor on which a high voltage is applied, an insulation capability is maintained in such a way that insulation gas is encapsulated at about 0.4 to 0.5 MPa-(G) of gas pressure (index (G) indicates an atmospheric-pressure basis), and an insulation material, such as an epoxy resin, is coated around a conductor (for example, refer to Patent Document 1).

Moreover, there is a well-known gas-insulated switchgear in which an insulation capability is maintained in such a way that insulation gas is encapsulated at low gas pressure in a pressure tank, and an epoxy-resin insulator covering a central conductor is disposed at a position at which a distance between the pressure tank and the central conductor of a bushing is short (for example, refer to Patent Document 2).

CONVENTIONAL ART DOCUMENT

Patent Document

Patent Document 1: Japanese Laid-Open Patent Publication No. 2003-319515 (FIG. 1)
Patent Document 2: Japanese Laid-Open Patent Publication No. 2001-266681 (FIG. 1)

SUMMARY OF THE INVENTION

Problems to be Solved by the Invention

In the above-described conventional gas-insulated electric devices, there has been a problem in that high gas pressure is applied to a pressure tank, so that a strong pressure tank must be provided by increasing a wall thickness of the pressure tank, and it is difficult that a weight and a cost of the device are reduced. Moreover, in a case where an epoxy-resin insulator is provided, when a relatively large current, for example 2000 A, is continuously passed through, a central conductor is closely contacted and covered by an epoxy resin, so that heat is not sufficiently radiated. Therefore, in order to suppress a temperature rise of the conductor, it is required that a cross-sectional area of the conductor is increased so as to decrease an electric resistance of the conductor, and a heat conductive capability is increased. Moreover, it is required that the epoxy resin being closely contacted with the central conductor, which can more endure to a high temperature in comparison with another epoxy resin being usually used, is adopted. By these requirements, a cost of components will be increased.

The present invention has been made to solve above-described problems, and an object of the invention is to provide a gas-insulated electric device by which a cross-sectional area of the central conductor can be reduced, and a heatproof temperature of the insulator can be lowered.

Means for Solving Problems

A gas-insulated electric device of the present invention, which has a pressure tank being electrically grounded, in which insulation gas is encapsulated, and a bushing, in which one end portion is hermetically fixed to an aperture of the pressure tank and the other end portion is sealed by a terminal conductor so as to encapsulate the insulation gas, in a state where a central conductor of the bushing is inserted from the bushing into the pressure tank, includes an insulation tube that ranges to portions facing to ground potential portions for the central conductor and to upper-lower portions along the grounding potential portions, and is coaxially arranged along the central conductor in a state where a gap intervenes between the central conductor and the insulation tube; a conductive layer that is formed on an inner surface of the insulation tube and is electrically connected to the central conductor; and a ground layer that is formed in an inside or on an outer surface of the insulation tube and is grounded; wherein heat generated from the central conductor is radiated by convecting the insulation gas through the gap between the central conductor and insulation tube.

Effects of the Invention

In the gas-insulated electric device of the present invention, the heat generated from the central conductor is radiated by convecting the insulation gas through the gap between the central conductor and the insulation tube, so that a cross-sectional area of the central conductor can be reduced, and a used material of the central conductor 11 can be reduced. Moreover, a convection amount of the insulation gas between an upper portion and a lower portion of the insulation tube can be increased, so that a temperature rise is totally can be suppressed. Furthermore, a heatproof capability of a resin used for the insulation tube can be decreased. The other objects, characteristics, viewpoints, and effects of the present invention, which are not described above, will be more visibly indicated by the following detailed explanations for the present invention in reference to drawings.

MODE FOR CARRYING OUT THE INVENTION

Embodiment 1

Figure 1:
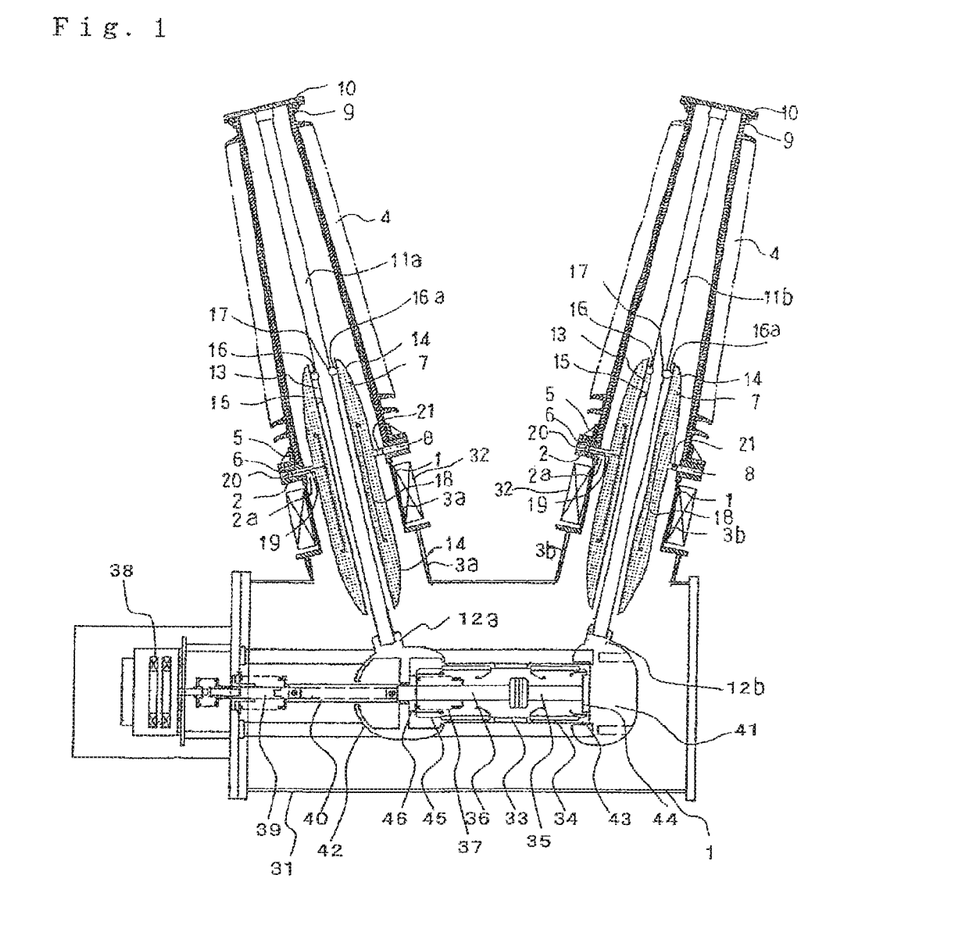
FIG. 1 is a cross-sectional view illustrating a gas-insulated electric device according to Embodiment 1 of the present invention.

FIG. 1 is a cross-sectional view illustrating a gas-insulated electric device according to Embodiment 1 of the present invention. In FIG. 1, a pressure tank 1, which is electrically grounded, is arranged in such a way that a body 31 is horizontally disposed. In order to dispose an electric power connecting portion, a pair of linking holes 3a and 3b as a part of the pressure tank 1 is provided at an upper portion of the pressure tank 1. A current transformer 32 for measuring a current is arranged at the outside of the linking holes 3a and 3b. In the pressure tank 1, a vacuum valve 33 is arranged in a state where a gap intervenes between the body 31 and the vacuum valve 33. The vacuum valve 33 is composed of a cylindrical vacuum case 34 made from an insulation material, a fixed conductor 35 installed at one end portion in the vacuum case 34, and a movable conductor 36, which can be closed to or separated from the fixed conductor 35, installed at the other end portion in the vacuum case 34. The movable conductor 36 is led to the outside of the vacuum case 34 via bellows 37 mounted at the other end portion in the vacuum case 34.

An open/close means 38 for connecting/separating and opening/closing the fixed conductor 35 and the movable conductor 36 is provided at the outside of the pressure tank 1. The open/close means 38 connects/separates and opens/closes the fixed conductor 35 and the movable conductor 36 by shifting the movable conductor 36 in a horizontal direction via an operation rod 39 and an insulation rod 40. A fixed-side shield 41 and a movable-side shield 42 are respectively disposed at both end portions of the vacuum valve 33. The fixed-side shield 41 is arranged so as to cover a fixed-side end portion 43 of the vacuum valve 33, and connected to a fixed-side end plate 44. The movable-side shield 42 is arranged so as to cover a movable-side end portion 45 of the vacuum valve 33, and is connected to a movable-side end plate 46. Conductors 12a and 12b, which are respectively connected to central conductors 11a and 11b of the electric power connecting portion, are disposed at upper portions of the fixed-side shield 41 and the movable-side shield 42. The electric power connecting portion will be explained in reference to FIG. 2.

Figure 2:
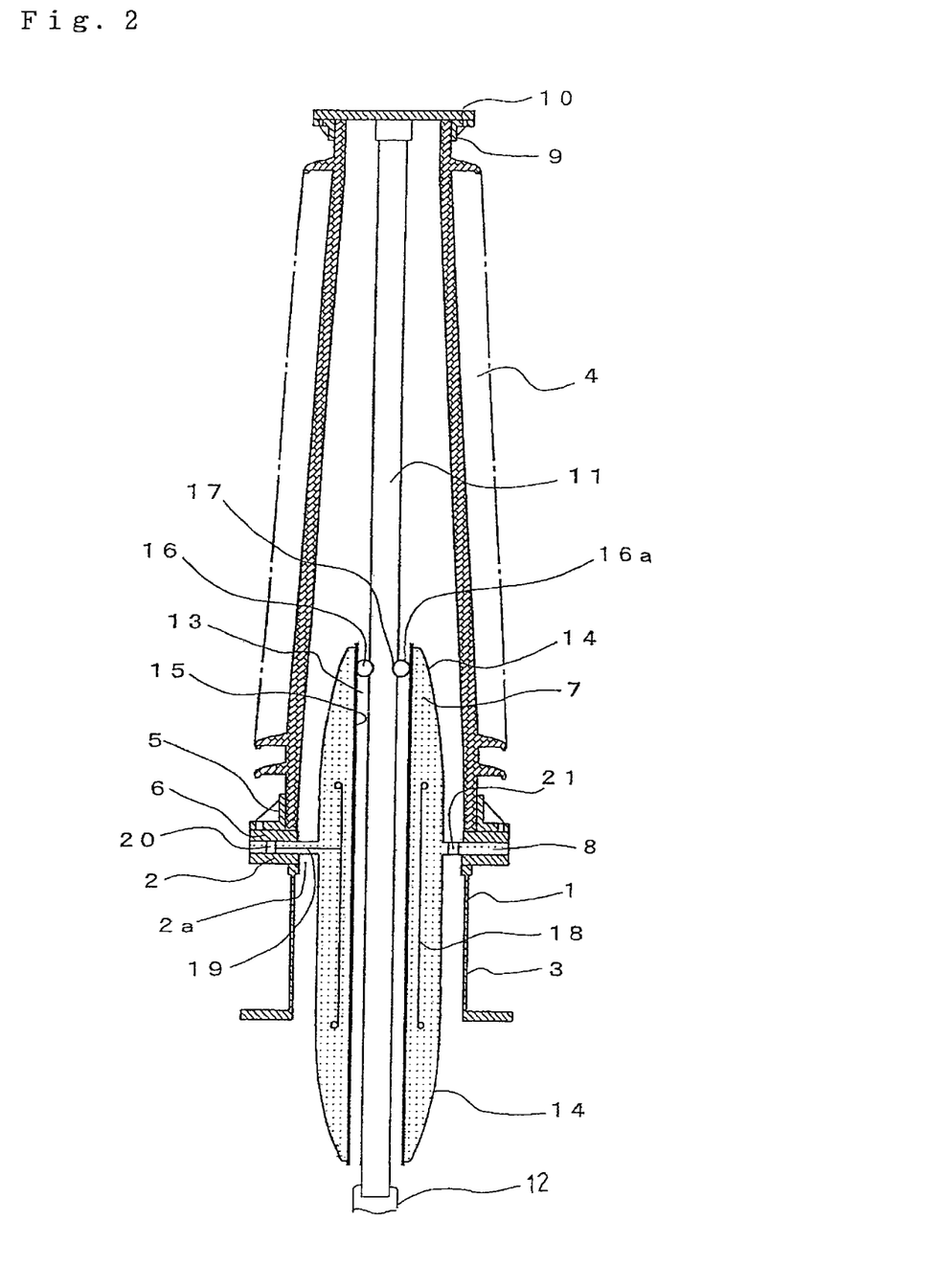
FIG. 2 is a cross-sectional view illustrating an electric power connecting portion of the gas-insulated electric device according to Embodiment 1 of the present invention.

FIG. 2 is a cross-sectional view illustrating an electric power connecting portion of the gas-insulated electric device according to Embodiment 1 of the present invention. In FIG. 2, the electric power connecting portion in FIG. 1 is enlarged, and the current transformer 32 of the electric power connecting portion is omitted. Although a pair of electric power connecting portions is provided in FIG. 1, the same component can be used for the both electric power connecting portions, so that the unilateral electric power connecting portion will be explained. In addition, in FIG. 2 through FIG. 6, symbols "3a" and "3b" are presented by a symbol "3", and symbols "11a" and "11b" are presented by a symbol "11", and moreover, symbols "12a" and "12b" are presented by a symbol "12". In FIG. 2, a metallic tank-side flange 2 having an aperture 2a is provided at a linking hole 3 of the pressure tank 1 that is electrically grounded. A metallic bushing-side flange 6 is fixed by an annular attaching implement 5 at one end portion of a bushing 4. The bushing-side flange 6 and an attaching portion 8 of an insulation tube 7 (described later) are hermetically fixed to the tank-side flange 2. A terminal conductor 10 is hermetically fixed by an annular attaching implement 9 at the other end portion of the bushing 4. A central conductor 11 is coaxially inserted in the bushing 4, whereby one end portion of the central conductor 11 is connected to a conductor 12 at the pressure tank 1 side, and the other end portion of the central conductor 11 is connected to the terminal conductor 10.

The cylindrical-shaped insulation tube 7 is an epoxy-resin insulator, and the insulation tube 7 is coaxially arranged along the central conductor 11 in a state where a cylindrical-shaped gap 13 intervenes between the central conductor 11 and the insulation tube 7. The insulation tube 7 includes an insulating end portion 14 having a conical-trapezoidal shape, which is connected to both ends of the insulation tube 7. The insulating end portion 14 having a conical-trapezoidal shape is extended, in accordance with a voltage level, at both ends in a predetermined distance. A length of the insulation tube 7 in a longitudinal direction (a parallel direction along the central conductor) ranges to portions facing to ground potential portions (the linking hole 3 of the pressure tank 1, the tank-side flange 2, and the bushing-side flange 6) for the central conductor 11, and ranges to upper-lower portions along the ground potential portions. On the inner surface of the insulation tube 7, a pipe conductor 15 (a conductive layer), which is made from a metal or a conductive resin, is coaxially formed along the central conductor 11. In addition, when the conductive layer 15 on the inner surface of the insulation tube 7 is formed by painting conductive paint, the pipe conductor 15 can be more thinly formed, so that insulation tube 7 can be downsized.

A connecting element 16 is provided in such a way that the central conductor 11 and the pipe conductor 15 are set to have the same potential. In FIG. 2, a coil spring 16a made from a metal, such as a stainless or cuprous alloy, is disposed in such a way that the coil spring 16a contacts to the central conductor 11 and the pipe conductor 15, and a groove 17 having a ring shape is formed on the central conductor 11 so as to prevent a drop and a positional deviation of the coil spring 16a. The central conductor 11 and the pipe conductor 15 can be set to have the same potential, without inhibiting convection in the gap 13, by the coil spring 16a. Although the pipe conductor 15 is formed by a component having a pipe shape, a center of the insulation tube 7 has a hollow shape, so that the similar effect can be obtained by painting the conductive paint on the inner surface of the insulation tube 7.

A metallic-cylindrical ground layer 18 is installed in the insulation tube 7 in such a way that the ground layer 18 is coaxially disposed along the central conductor 11. The ground layer (conductive layer) 18 is connected, by a connecting piece 19, to the buried metal 20 provided at the attaching portion 8 of the insulation tube 7, and the buried metal 20 is connected to the tank-side flange 2 so as to be grounded. The ground layer 18 may be formed on the outer surface at a central portion (a base portion without an isolating end portion) of the insulation tube 7. Isolation gas is encapsulated in the pressure tank 1 and the bushing 4. The isolation gas is passed through the cylindrical gap 13 between the insulation tube 7 and the central conductor 11, and can be flowed between the pressure tank 1 and the bushing 4. Moreover, a through hole 21 is formed at the attaching portion 8 of the insulation tube 7, and the isolation gas can be flowed between the bushing 4 and the pressure tank 1. Convection of the isolation gas between the bushing 4 and the pressure tank 1 can be flowed, by the through hole 21, in portions without the gap 13, whereby a convection amount can be increased in comparison with a case where only the gap 13 is formed. As a result, the convection amount is more increased in comparison with a configuration in which only the gap 13 is formed, so that the gap 13 can be downsized. A cross-sectional area of the central conductor 11 can be reduced, and the insulation tube 7 can be downsized.

As described above, the gap 13 is formed between the insulation tube 7 and the central conductor 11 for passing a current, so that heat can be radiated from the central conductor 11 into the insulation gas. Therefore, even when a relatively large current is passed through, it is not required that the cross-sectional area of the central conductor 11 is increased. When the same amount of a current is passed through, the cross-sectional area of the central conductor 11 can be more reduced, by forming the gap 13, in comparison with a configuration in which the central conductor 11 is closely contacted with the insulation tube 7, so that a cost of materials can be reduced. Moreover, when the same amount of a current is passed through, heat radiation is more advanced, by forming the gap 13, in comparison with the configuration in which the central conductor 11 is closely contacted with the insulation tube 7. Therefore, if the cross-sectional area of the central conductor 11 is not reduced, a heatproof capability of a resin used for the insulation tube 7 can be decreased, whereby a cost of components can be reduced. The central conductor 11 and the pipe conductor 15, which are provided in the insulation tube 7, are set to have the same potential by the coil spring 16a, whereby an electric field strength at a surface of the central conductor 11 is reduced, and it is not required that an electric field distribution around the insulation tube 7 is substantially varied.

In addition, if the pipe conductor 15 doesn't exist and only the gap 13 exists in the configuration illustrated in FIG. 2, and when a high voltage is applied to the central conductor 11, an electric field is concentrated into the gap 13, so that an electric discharge is generated, and an insulation capability can't be maintained.

Dry air, used as insulation gas, having a moisture content of 1000 ppm is encapsulated inside of the pressure tank 1 and the bushing 4. In Embodiment 1, although the maximum gas pressure is lower than 0.2 MPa-(G), the value of the gas pressure is limited to the maximum gas pressure. Because the gas pressure in the pressure tank 1 is set to be lower than 0.2 MPa-(G), intensity of the pressure tank 1 can be lowered, and it is realized that a thickness of the pressure tank 1 can be thinned, and stiffening components of the pressure tank 1 can be reduced or simplified, whereby a weight and a cost of the device can be reduced. Moreover, it is not required that the pressure tank 1 is examined so as to be adapted to a second grade pressure tank.

In addition, although dry air used as insulation gas is indicated in Embodiment 1, it is not limited that the dry air is used for as insulation gas, and nitrogen gas or carbon dioxide gas can be used. Moreover, when SF6 gas having a high insulation capability is used as the insulation gas, the gas pressure in the pressure tank 1 is more decreased, whereby the pressure tank 1 can be downsized.

Embodiment 2

Figure 3:
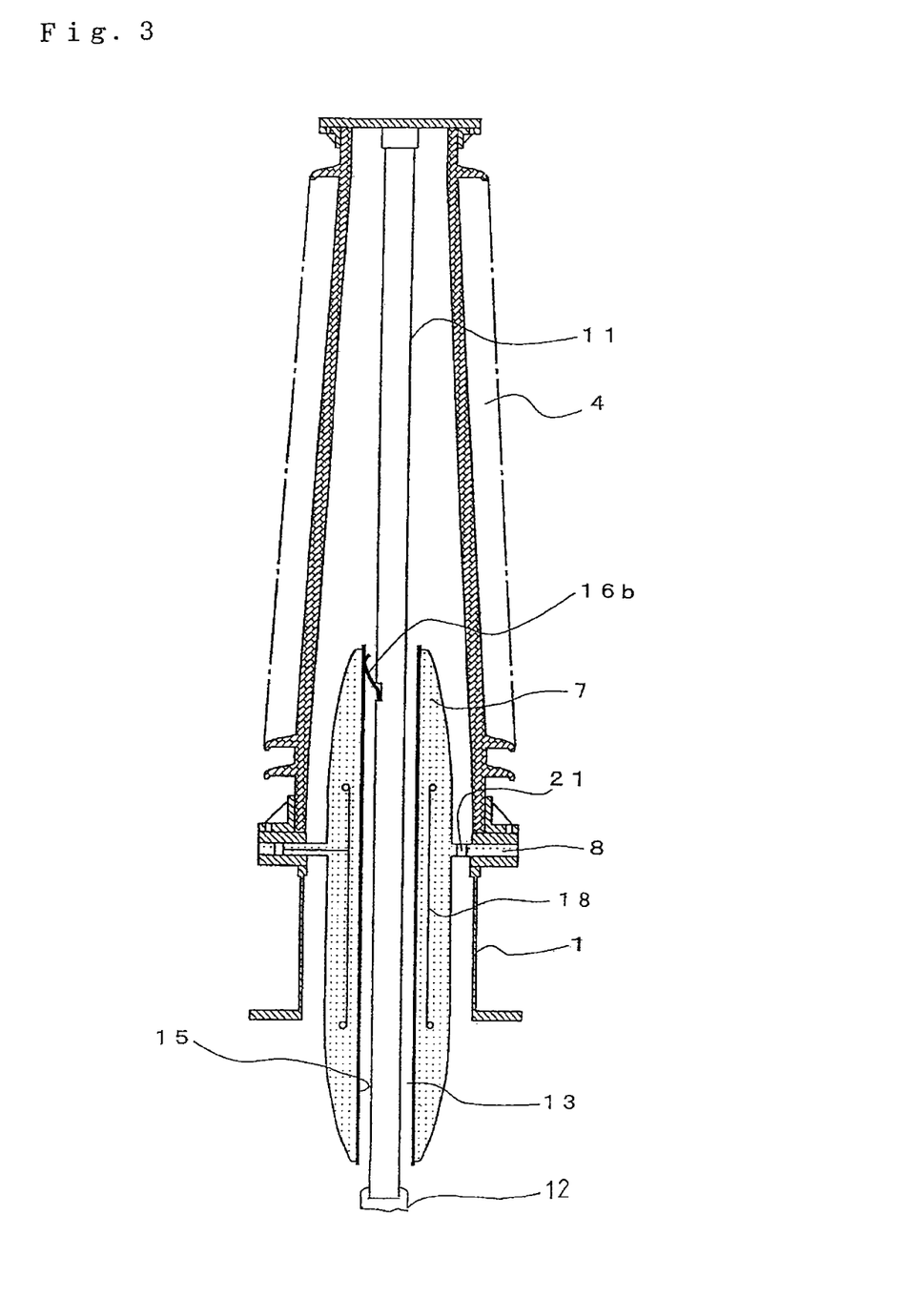
FIG. 3 is a cross-sectional view illustrating an electric power connecting portion of a gas-insulated electric device according to Embodiment 2 of the present invention.

FIG. 3 is a cross-sectional view illustrating an electric power connecting portion of a gas-insulated electric device according to Embodiment 2 of the present invention. In FIG. 3, reference symbols, which are the same as those in each of FIG. 1 and FIG. 2, refer to the same or equivalent parts, and duplicate explanations are omitted. In addition, other cases for the electric power connecting portion in Embodiment 1 are indicated in FIG. 3 through FIG. 6. Although the electric power connecting portion illustrated in FIG. 3 is configured so as to be similar to the electric power connecting portion according to Embodiment 1, different points will be explained. In order to set a central conductor 11 and a pipe conductor 15 to be at the same potential, a plate spring 16b, which is fixed to the central conductor 11 and is made from an elastic metal, is contacted to the pipe conductor 15. Thereby, the central conductor 11 and the pipe conductor 15 can be set to have the same potential without preventing convection of insulation gas in a gap 13.

Embodiment 3

Figure 4:
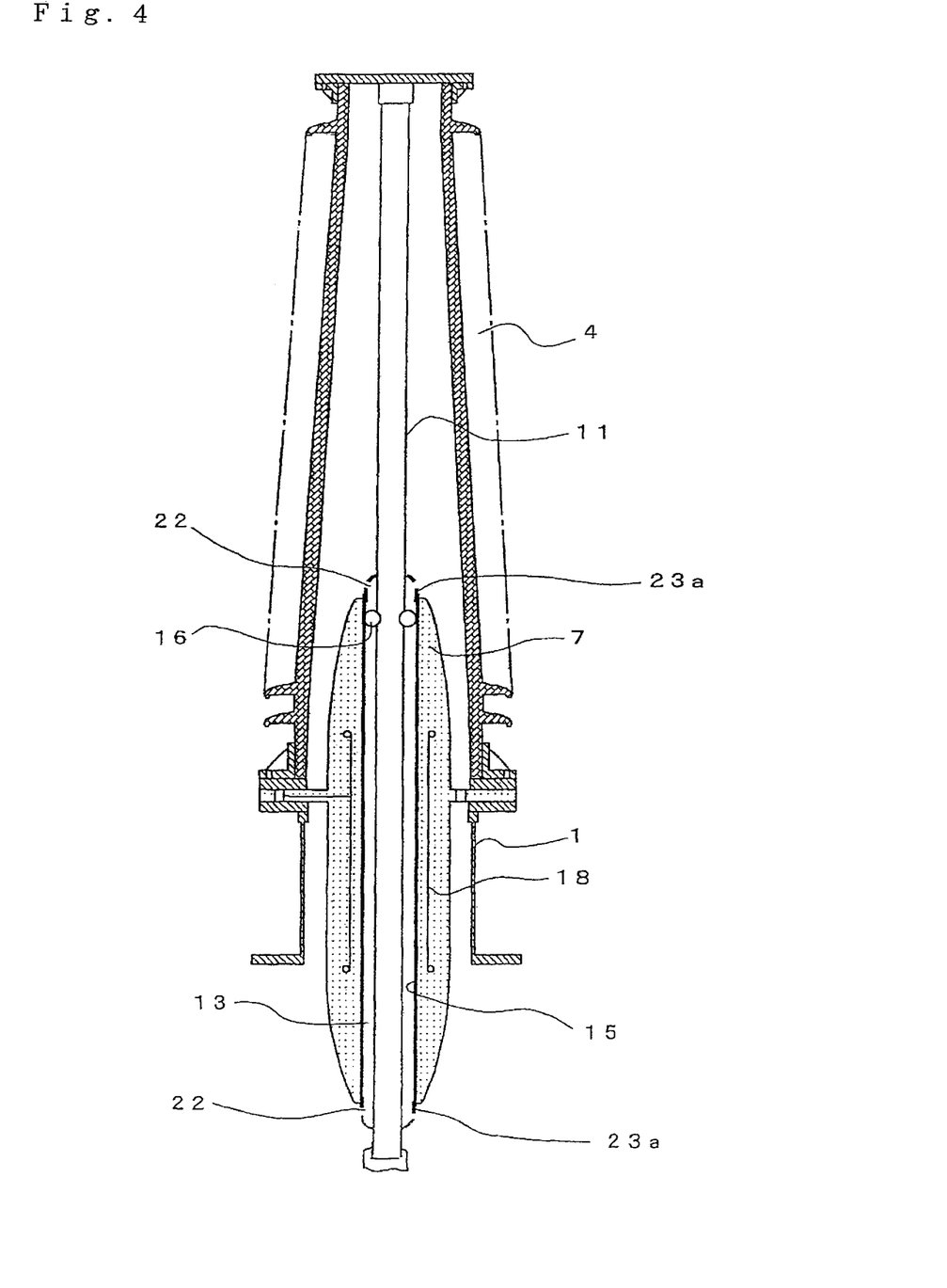
FIG. 4 is a cross-sectional view illustrating an electric power connecting portion of a gas-insulated electric device according to Embodiment 3 of the present invention.

FIG. 4 is a cross-sectional view illustrating an electric power connecting portion of a gas-insulated electric device according to Embodiment 3 of the present invention. Although the electric power connecting portion according to Embodiment 3 is similarly configured to the electric power connecting portion according to Embodiment 1, different portions will be explained. A shield 23a having a roughly hemispherical shape, which includes a ventilation hole 22, is arranged at one end portion or both end portions of a pipe conductor 15. The electric field strength at the end portions of the pipe conductor 15 can be relieved by arranging the shield 23a. Moreover, convection of insulation gas passed through a gap 13 is not prevented by forming the ventilation hole 22. The shield 23a is made from a metal or a conductive resin. If the shield 23a has a configuration by which it can be attached in a state where it is divided into two pieces, the shield 23a can be assembled regardless of a sequence of an assembly procedure for an insulation tube 7 and a central conductor 11. The central conductor 11 and the pipe conductor 15 are electrically connected by a coil spring 16a in a similar way described in Embodiment 1. As described in Embodiment 2, a plate spring 16b may be used instead of using the coil spring 16a.

Embodiment 4

Figure 5:
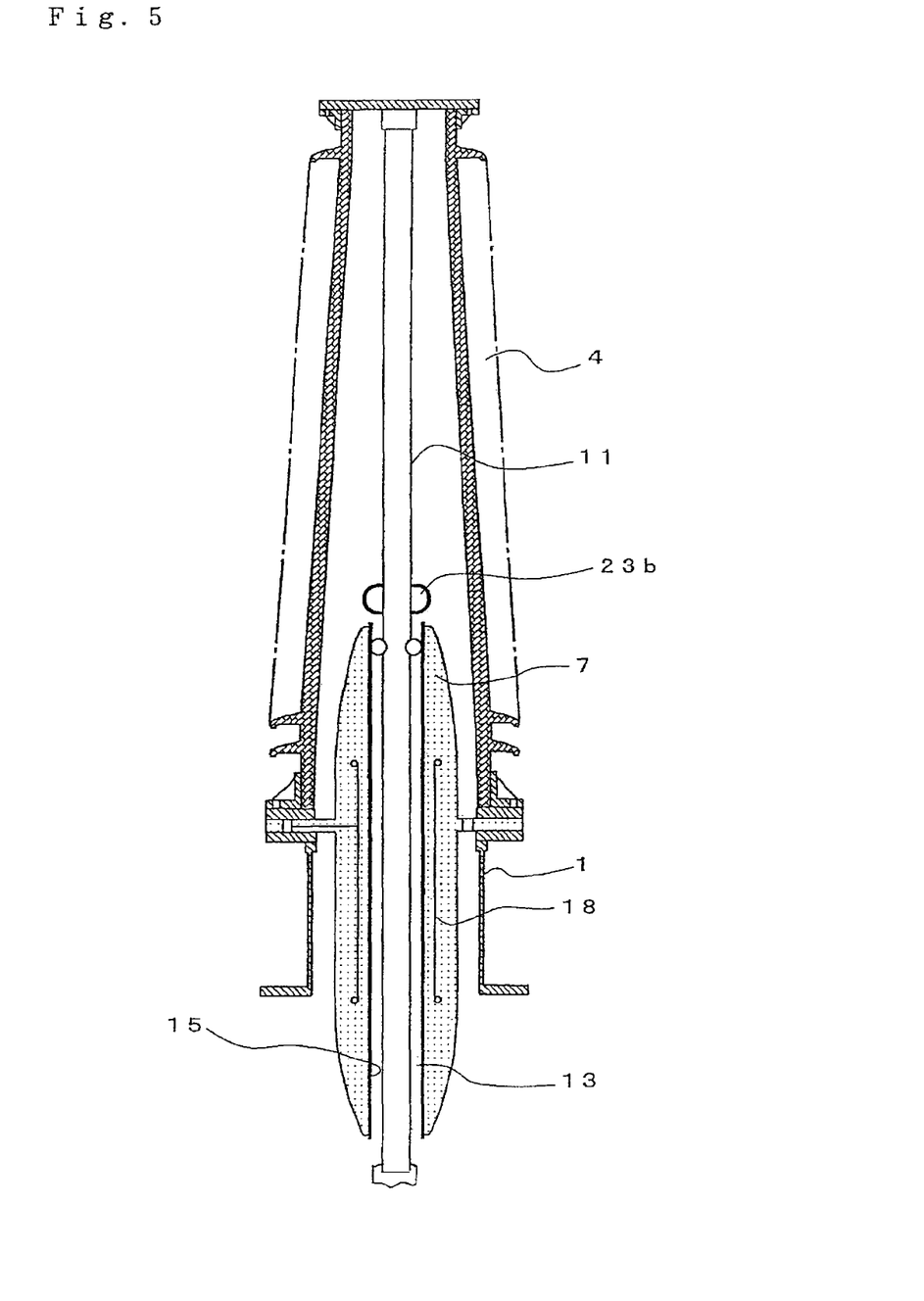
FIG. 5 is a cross-sectional view illustrating an electric power connecting portion of a gas-insulated electric device according to Embodiment 4 of the present invention.

FIG. 5 is a cross-sectional view illustrating an electric power connecting portion of a gas-insulated electric device according to Embodiment 4 of the present invention. Although the electric power connecting portion according to Embodiment 4 is similarly configured to the electric power connecting portion according to Embodiment 1, different portions will be explained. A shield 23b having a roughly circular plate shape, in which corner portions are formed in a round shape, is arranged at a central conductor 11 near one end portion or both end portions of a pipe conductor 15. The electric field strength at the end portions of the pipe conductor 15 can be relieved by arranging the shield 23b. Moreover, in Embodiment 4, when convection is not inhibited in space between the pipe conductor 15 and the shield 23b, it is not particularly required that the ventilation hole 22, which is required for the shield 23a in Embodiment 3, is formed. In addition, the shield 23b having a roughly circular plate shape may be held not only at the central conductor 11 but also at end portion or both end portions of the pipe conductor 15 in a state where a gap intervenes between the central conductor 11 and the pipe conductor 15. The shield 23b is configured by using a metal or a conductive resin. Moreover, in order to be assembled regardless of a sequence of an assembly procedure for an insulation tube 7 and the central conductor 11, the shield 23b has a configuration by which it can be attached in a state where it is divided into two pieces. In a similar way described in Embodiment 1 and Embodiment 2, the central conductor 11 and the pipe conductor 15 may be electrically connected by a coil spring 16a or a plate spring 16b.

Embodiment 5

Figure 6:
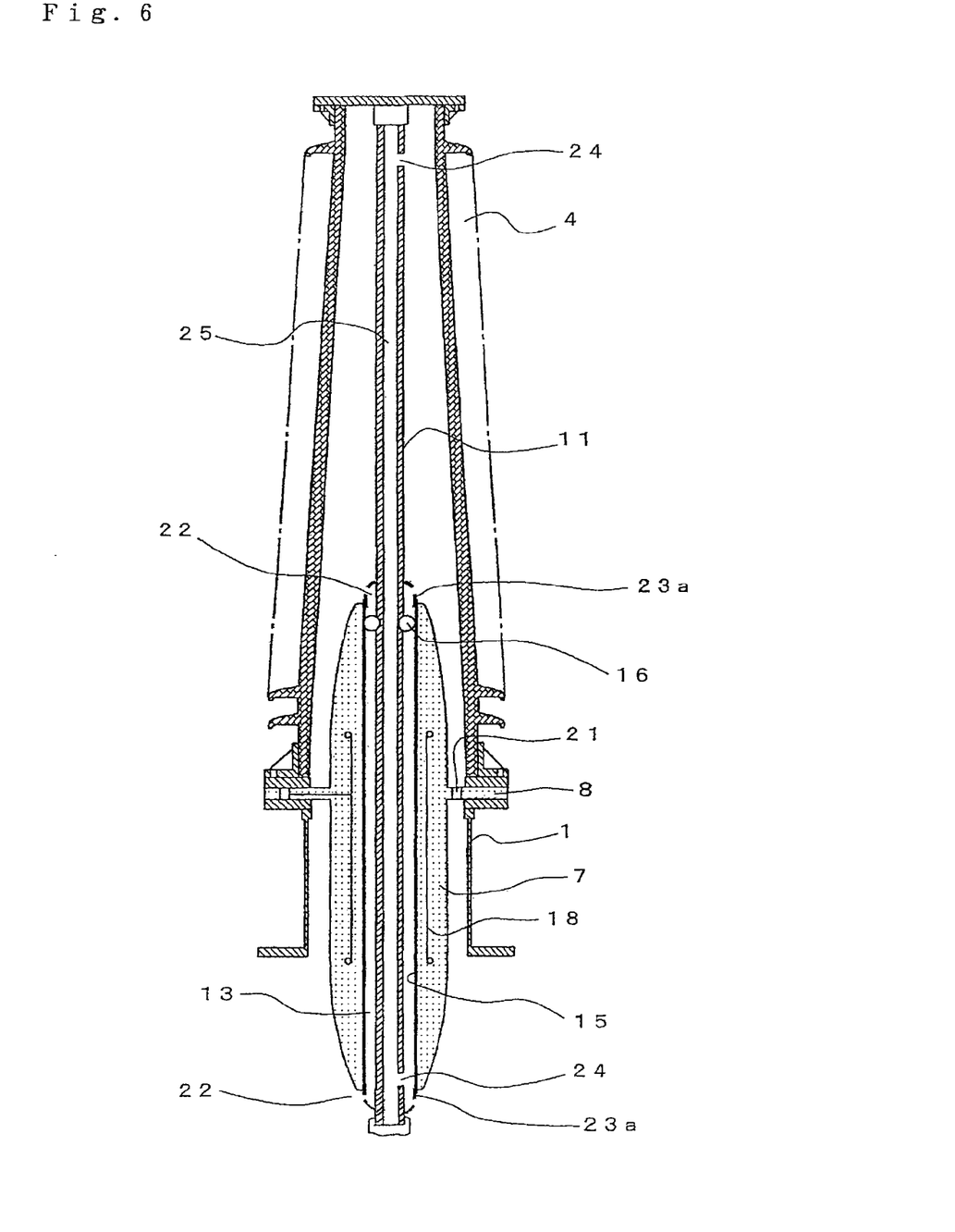
FIG. 6 is a cross-sectional view illustrating an electric power connecting portion of a gas-insulated electric device according to Embodiment 5 of the present invention.

FIG. 6 is a cross-sectional view illustrating an electric power connecting portion of a gas-insulated electric device according to Embodiment 5 of the present invention. In FIG. 6, a central conductor 11 is formed in a cylindrical shape or a pipe shape, whereby heat generated from the central conductor 11 is radiated to a gap 13 between the central conductor 11 and an insulation tube 7 as well as internal space 25 of the central conductor 11. Ventilation holes 24 are formed near both end portions of the central conductor 11. Because the gas-insulated electric device is configured as described above, a cross-sectional area of a metal or a used material of the central conductor 11 can be more reduced. In addition, the central conductor 11 having a cylindrical shape according to Embodiment 5 can be applied to the gas-insulated electric device according to Embodiment 1 through Embodiment 4.

It should be understood that several kinds of variations or modifications of the present invention can be realized within cases where a relational well-experienced engineer doesn't deviate from scope and spirit of the present invention, and those are not limited by the gas-insulated electric device according to each of Embodiment 1 through Embodiment 5 described in this specification.

What is claimed is:

1. A gas-insulated electric device having a pressure tank being electrically grounded, in which insulation gas is encapsulated, and a bushing, in which one end portion is hermetically fixed to an aperture of the pressure tank and the other end portion is sealed by a terminal conductor so as to encapsulate the insulation gas, in a state where a central conductor of the bushing is inserted from the bushing into the pressure tank, the gas-insulated electric device comprising:

an insulation tube vertically disposed that ranges to portions facing to ground potential portions for the central conductor and to upper-lower portions along the grounding potential portions, and is coaxially arranged along the central conductor in a state where a vertically through gap intervenes between the central conductor and the insulation tube along an entire length of the insulation tube;

a conductive layer that is formed on an inner surface of the insulation tube facing the gap and the central conductor and electrically connected to the central conductor; and a ground layer that is formed in an inside of the insulation tube or on an outer surface of the insulation tube and is grounded;

wherein the gap between the central conductor and the insulation tube connects an internal space of the pressure tank and an internal space of the bushing, and wherein heat generated from the central conductor is radiated by convecting the insulation gas through the gap and passing the insulation gas through the gap from one end of the gap to an other end of the gap, thereby the insulation gas in the internal space of the pressure tank flows via the gap into the internal space of the bushing.

2. A gas-insulated electric device as recited in claim 1, wherein the conductive layer on an inner surface of the insulation tube is formed by painting conductive paint.

3. A gas-insulated electric device as recited in claim 1, wherein the insulation tube is coaxially arranged along the central conductor in a state where a cylindrical gap intervenes between the central conductor and the insulation tube, and the conductive layer formed on the inner surface of the insulation tube is a conductor having a pipe shape.

4. A gas-insulated electric device as recited in claim 1, wherein a through hole for linking the isolation gas in the bushing with the isolation gas in the pressure tank is formed at an attaching portion for attaching the insulation tube to the pressure tank.

5. A gas-insulated electric device as recited in claim 4, wherein the central conductor has a cylindrical shape.

6. A gas-insulated electric device as recited in claim 1, wherein a metal coil spring intervenes in a gap between the central conductor and the conductive layer on the inner surface of the insulation tube, whereby the central conductor and the conductive layer on the inner surface of the insulation tube are electrically connected.

7. A gas-insulated electric device as recited in claim 1, wherein a metal plate spring intervenes in a gap between the central conductor and the conductive layer on the inner surface of the insulation tube, whereby the central conductor and the conductive layer on the inner surface of the insulation tube are electrically connected.

8. A gas-insulated electric device as recited in claim 1, wherein a shield having a roughly hemispherical shape, which includes a ventilation hole, is arranged at an end portion of the conductive layer on the inner surface of the insulation tube.

9. A gas-insulated electric device as recited claim 1, wherein a shield having a roughly circular plate shape, in which corner portions are formed in a round shape, is arranged at an end portion or a neighboring portion of the conductive layer on the inner surface of the insulation tube.

10. A gas-insulated electric device as recited in claim 4, wherein a metal coil spring intervenes in a gap between the central conductor and the conductive layer on the inner surface of the insulation tube, whereby the central conductor and the conductive layer on the inner surface of the insulation tube are electrically connected.

11. A gas-insulated electric device as recited in claim 5, wherein a metal coil spring intervenes in a gap between the central conductor and the conductive layer on the inner surface of the insulation tube, whereby the central conductor and the conductive layer on the inner surface of the insulation tube are electrically connected.

12. A gas-insulated electric device as recited in claim 4, wherein a metal plate spring intervenes in a gap between the central conductor and the conductive layer on the inner surface of the insulation tube, whereby the central conductor and the conductive layer on the inner surface of the insulation tube are electrically connected.

13. A gas-insulated electric device as recited in claim 5, wherein a metal plate spring intervenes in a gap between the central conductor and the conductive layer on the inner surface of the insulation tube, whereby the central conductor and the conductive layer on the inner surface of the insulation tube are electrically connected.

14. A gas-insulated electric device as recited in claim 4, wherein a shield having a roughly hemispherical shape, which includes a ventilation hole, is arranged at an end portion of the conductive layer on the inner surface of the insulation tube.

15. A gas-insulated electric device as recited in claim 6, wherein a shield having a roughly hemispherical shape, which includes a ventilation hole, is arranged at an end portion of the conductive layer on the inner surface of the insulation tube.

16. A gas-insulated electric device as recited in claim 7, wherein a shield having a roughly hemispherical shape, which includes a ventilation hole, is arranged at an end portion of the conductive layer on the inner surface of the insulation tube.

17. A gas-insulated electric device as recited in claim 4, wherein a shield having a roughly circular plate shape, in which corner portions are formed in a round shape, is arranged at an end portion or a neighboring portion of the conductive layer on the inner surface of the insulation tube.

18. A gas-insulated electric device as recited in claim 6, wherein a shield having a roughly circular plate shape, in which corner portions are formed in a round shape, is arranged at an end portion or a neighboring portion of the conductive layer on the inner surface of the insulation tube.

19. A gas-insulated electric device as recited in claim 7, wherein a shield having a roughly circular plate shape, in which corner portions are formed in a round shape, is arranged at an end portion or a neighboring portion of the conductive layer on the inner surface of the insulation tube.

\* \* \* \* \*